(12) United States Patent
He et al.

(10) Patent No.: US 7,223,026 B1
(45) Date of Patent: May 29, 2007

(54) SOLDER-FREE PACKAGING FOR INTEGRATED FIBER OPTICS DEVICE

(75) Inventors: Chun He, Fremont, CA (US); Steven Zhu, Fremont, CA (US); Chuying Chen, Fremont, CA (US)

(73) Assignee: Alliance Fiber Optic Products, Inc.

( * ) Notice: Subject to any disclaimer, the term of this patent is extended or adjusted under 35 U.S.C. 154(b) by 175 days.

(21) Appl. No.: 11/127,951

(22) Filed: May 12, 2005

Related U.S. Application Data

(60) Provisional application No. 60/644,848, filed on Jan. 18, 2005.

(51) Int. Cl.
*G02B 6/36* (2006.01)

(52) U.S. Cl. ........................................................ 385/91
(58) Field of Classification Search .............. 385/88–92
See application file for complete search history.

(56) References Cited

U.S. PATENT DOCUMENTS

| | | | |
|---|---|---|---|
| 4,790,618 A * | 12/1988 | Abe | 385/93 |
| 5,074,682 A * | 12/1991 | Uno et al. | 385/93 |
| 5,291,571 A * | 3/1994 | Kunikane et al. | 385/93 |
| 5,546,212 A * | 8/1996 | Kunikane et al. | 398/136 |
| 5,940,564 A * | 8/1999 | Jewell | 385/93 |
| 6,108,359 A * | 8/2000 | Tatsuta | 372/36 |
| 6,302,596 B1 * | 10/2001 | Cohen et al. | 385/93 |
| 6,758,609 B2 * | 7/2004 | Fathi et al. | 385/91 |
| 6,793,406 B1 * | 9/2004 | Edwards et al. | 385/88 |
| 6,966,705 B2 * | 11/2005 | Sato et al. | 385/88 |
| 2002/0150355 A1 * | 10/2002 | Wang et al. | 385/92 |
| 2002/0168153 A1 * | 11/2002 | Yamabayashi et al. | 385/88 |
| 2003/0190481 A1 * | 10/2003 | Peeler et al. | 428/423.1 |

* cited by examiner

*Primary Examiner*—Ellen E. Kim
(74) *Attorney, Agent, or Firm*—Joe Zheng

(57) ABSTRACT

Techniques for packaging in an optical device and an opto-electrical conversion device are disclosed. According to one aspect of the techniques, the optical device is packaged in a piece of tubing and the opto-electrical conversion device is packaged in a TO-can. While the optical device and the opto-electrical conversion device are coaxially aligned, the tube and the TO-can are integrated by a certain amount of epoxy that is later cured by a UV light or heat. As a result, an integrated optical device is formed and enjoys features of small footprint, better alignment, enhanced impact performance, lower cost in addition to easier manufacturing process and environmental-safe.

15 Claims, 2 Drawing Sheets

SOLDER-FREE PACKAGING FOR INTEGRATED FIBER OPTICS DEVICE

CROSS-REFERENCE TO RELATED APPLICATION

This application claims the benefits of the provisional application, No. 60/644,848, entitled "Solder-free package for integrated fiber optic devices", filed Jan. 18, 2005, which is hereby incorporated by reference for all purposes.

BACKGROUND OF THE INVENTION

1. Field of the Invention

The invention is generally related to the area of optical communications. In particular, the present invention is related to solder-free packaging method for integrated fiber optics device and parts using the method.

2. The Background of Related Art

Generally, an opto-electronic integrated device includes an optical part integrated with an opto-electrical conversion device. The optical part can be a WDM (wavelength division multiplexing) device, an optical collimating or focusing optics, or an optical taping device that splits a small portion of the total input signal to an alternative optical path for monitoring the intensity and wavelength changes of the transmitted signal. The opto-electrical conversion device can be either a photodiode or a laser diode. The optical part and the opto-electrical conversion device are generally sealed in what is commonly referred to as a TO-can. A TO-can packaging of an opto-electrical conversion device includes a metallic case with a transmission window or opening on top for transmitting or receiving optical signals.

An exemplary traditional packaging approach of an integrated device 100 is illustrated in FIG. 1. The integrated device 100 includes various components such as an optical device 103 and an opto-electrical conversion device in a TO-can package 102. The optical device 103 generally includes a plurality of optical subcomponents that are preferably aligned and fixed relative to each other and mounted inside a piece of gold plated tubing by thermal curing epoxy. The individual devices 102 and 103 to be integrated are then aligned and fixed relative to each other. Traditionally, the individual devices 102 and 103 are integrated by soldering the metal tubing directly to the TO-can, if it is gold plated. Alternatively, the TO-can is mounted to a gold-plated metal tube via thermal curing epoxy, and then soldered to the device 104 that had been mounted inside the gold plated metal tubing.

The opto-electronic integrated fiber optics devices packaged by soldering suffers from several issues. In addition to the issues of the thermal instability and manufacturing difficulty, the soldering process is not an environmental-safe process. The industry is calling on all fiber optical communication components to be environmental-safe by 2007, there is a great need for alternative packaging of optics devices that are amenable to small footprint, broad operating wavelength range, enhanced impact performance, lower cost, easier manufacturing process and environmental-safe.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical modules or devices, particularly for packaging an opto-electrical conversion device and one or more optical subcomponents. Depending on an application, the opto-electrical conversion device may be photodiode-based (including one or more photodiodes) or laserdiode-based (including one or more laser diodes) to convert light to electronic signals or electronic signals to light. The optical subcomponents may be a collection of components for processing an optical signal (e.g., a multiplexed optical signal). An example of such subcomponents may include one or more collimators, wavelength filters and pieces of optical fibers.

According to one aspect of the present invention, an opto-electrical conversion device packaged in a TO-can and the optical device packaged in a piece of tube are aligned coaxially. A certain amount of epoxy is then applied to the contacts between the tube and the TO-can that are also coaxially aligned. The epoxy is then cured by either UV light illumination or by heat to cure the epoxy to form the integrated optical device.

The present invention may be implemented as a module, a device, a part of a subsystem and a method for making the same. For example, according to one embodiment, the present invention is a method for producing an integrated optical device, the method comprising providing an opto-electrical conversion device and an optical device, the opto-electrical conversion device packaged in a TO-can and the optical device packaged in a piece of tube, aligning the opto-electrical conversion device and the optical device coaxially, applying a certain amount of epoxy to contacts between the tube and the TO-can, and using UV light or heat to cure the epoxy to form the integrated optical device.

One of the objects, features, advantages of the present invention is to provide techniques for integrating an optical device and an opto-electrical conversion device without using the commonly used soldering process.

Other objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The present invention pertains to packaging individual devices applicable to optical applications. In one aspect, the present invention discloses improved methods for integrating an opto-electrical conversion device and one or more optical subcomponents. Depending on an application, the opto-electrical conversion device may be photodiode-based (including one or more photodiodes) or laserdiode-based (including one or more laser diodes) to convert light to electronic signals or electronic signals to light. The optical subcomponents may be a collection of components for processing an optical signal (e.g., a multiplexed optical signal). An example of such subcomponents may include one or more collimators, wavelength filters and pieces of optical fibers.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
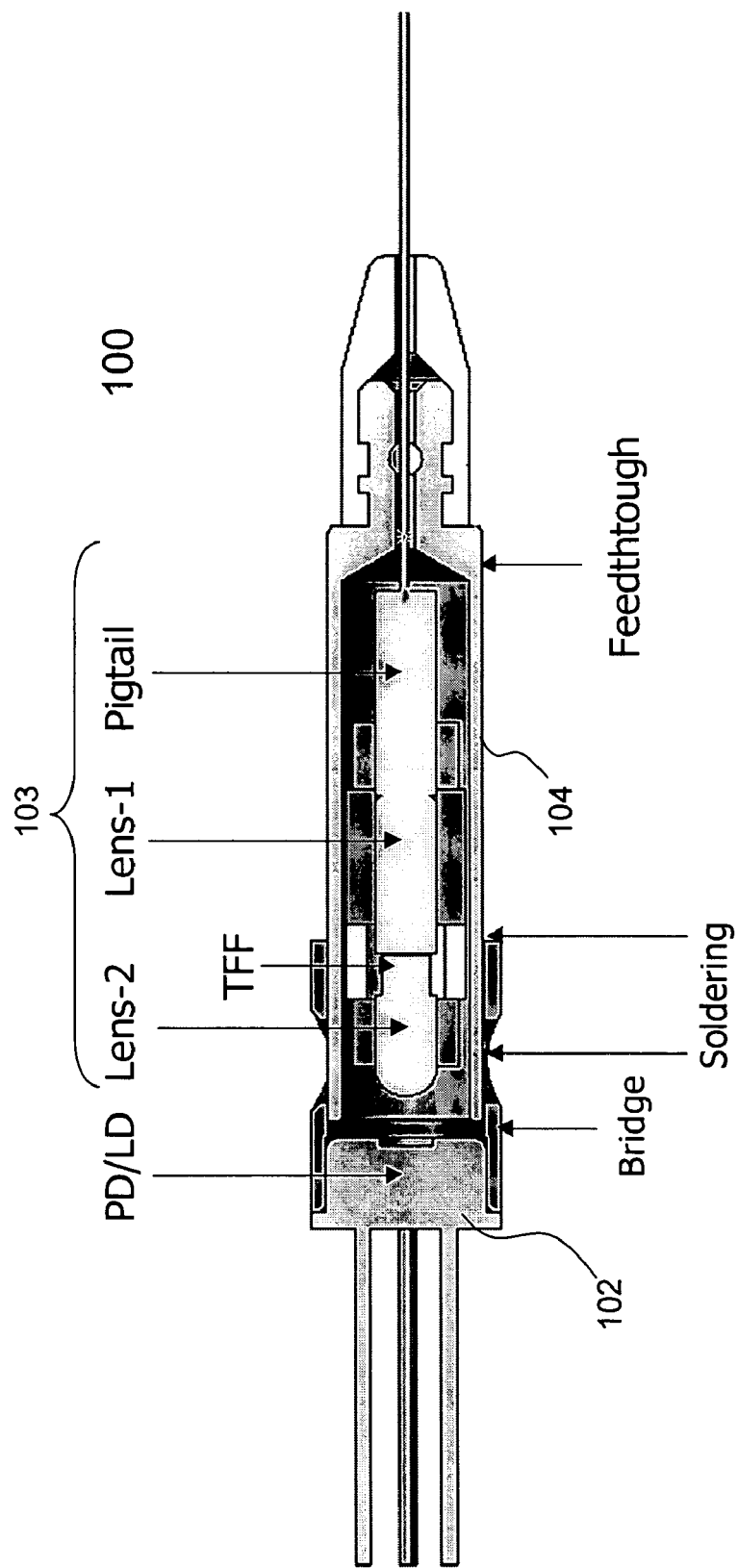
FIG. 1 shows an exemplary traditional packaging approach of an integrated device with soldering process.
Figure 2:
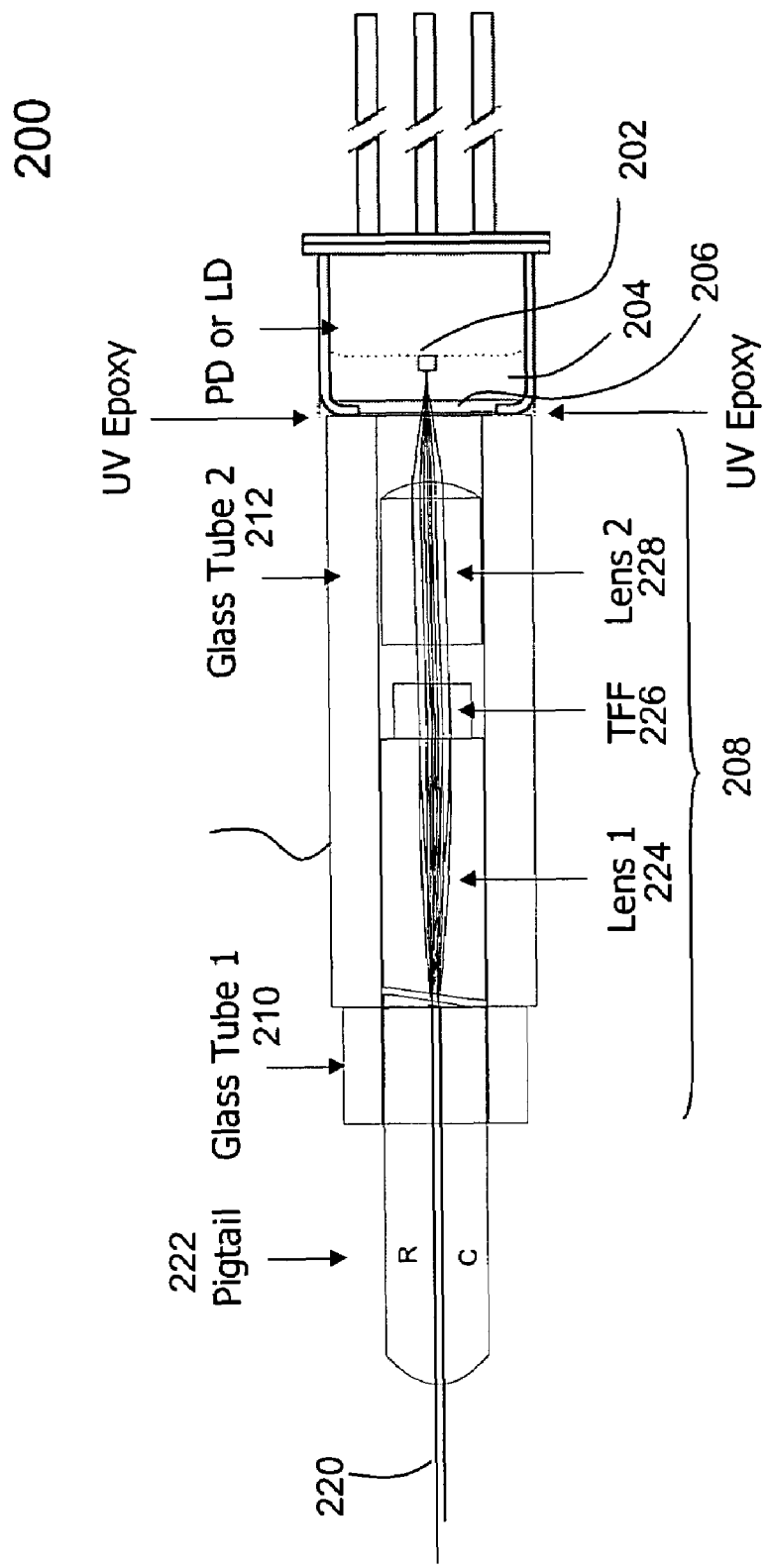
FIG. 2 shows an exemplary design according to one embodiment of the present invention without using soldering process.

Referring now to the drawings, in which like numerals refer to like parts throughout the several views. FIG. 2 shows an exemplary design 200 according to one embodiment of the present invention. The design 200 includes an opto-electrical conversion device 202 in a TO-can package 204 and an optical device 208. Depending on implementation, the opto-electrical conversion device 202 may be photodiode-based (including one or more photodiodes) or laser-diode-based (including one or more laser diodes) to convert light to electronic signals or electronic signals to light. The TO-can package 204 includes an opening 206 to allow a light beam to transmit through. The optical device 208, as shown, is an optical module for dropping a particular wavelength signal from multiplexed signals or adding a particular wavelength signal to multiplexed signals. It should be noted that there is no limitation of what type of the optical device 208 may be.

According to one aspect of the present invention, the optical device 208 is mounted inside a piece of transparent glass tubing 212 with a certain amount of UV light curable epoxy. A fiber pigtail is mounted inside another piece of transparent glass tube 210. The glass tube 210 is then joined onto the glass tube 212 by UV epoxy. One of the reasons for mounting the optical device and the fiber pigtail into 2 pieces of glass tubes and then joining them together to form one piece is for the purpose of optical alignment and the fixing of the optical device and the fiber pigtail. After being aligned, the transparent glass tubing 212 with the optical device 208 inside is mounted directly onto the TO-can 204 by UV light curable epoxy. The TO-can surface may be treated by a reduction agent based primer to increase its bounding ability with epoxy. It is well known that the UV curing process has the advantage of fast curing process and with minimal drift of alignment. As a result, an integrated optic device, such as the design 200 in accordance with the present invention, is not only amenable to small footprint, enhanced impact performance and lower cost but also easier manufacturing process and environmental-safe.

In one embodiment, an optical alignment is first done between the transparent glass tubing 210 with the optical device 208 inside and the TO-can package 204. The UV light curable epoxy is then applied between the interface formed by the glass tubing end surface and the TO-can flat surface. The integrated optic device is formed after the epoxy is cured by a VU light.

According to another embodiment, the finished integrated optic device may be sealed in a section of metal tubing for the purpose of moisture sealing and mechanical protection.

To facilitate the better understanding of the present invention, it is assumed that a multiplexed signal 220 carrying three (3) signals at three different wavelengths $\lambda 1$, $\lambda 2$, and $\lambda 3$. In the fiber-to-home applications, there are typically two or three light signals at wavelengths 1310 nm, 1490 nm and 1550 nm multiplexed for transmission to a destination. In general, the 1490 nm signal carries distributed data/voice signal and the 1550 nm carries distributed video signal, both the 1490 nm signal and the 1550 nm signal are multiplexed for transmission, while the 1310 nm signal carries data/voice signal that is transmitted at opposite direction to that of the 1490 nm and 1550 nm signals in full duplex mode. At a certain point, the 1490 nm signal and the 1550 nm signal shall be separated without interference to each other or to the 1310 nm signal and with minimum loss to each of the signals.

Regardless of applications, the multiplexed signal 220 is coupled by one of the two cores in the pigtail 222, labeled by C, onto the lens 224 with a small angle. The multiplexed signal 222 is then collimated by the lens 224 onto a filter 226. The filter 226 is configured to transmit one of the three wavelengths, for example, $\lambda 1$. As a result, the $\lambda 1$ signal is transmitted through the filter 266 and the signal with $\lambda 1$ and $\lambda 2$ is reflected back to the lens 224. Since the multiplexed signal 220 is projected onto the lens 224 with a small incident angle, the reflected signal (i.e., the multiplexed signal 222 excluding the $\lambda 1$ wavelength) goes off the optical path for the incoming signal 524 and is coupled to the second fiber core, labeled by R, in the pigtail 222 to output the reflected signal.

At the same time, the transmitted signal from the lens 224 now includes the wavelength $\lambda 1$ and impinges upon the electric-to-light converter 202 (e.g., an opto-electrical conversation device) that outputs a corresponding electronic signal.

Alternatively, an electronic signal may be coupled to the electric-to-light converter 202 to be converted to a light signal with a particular wavelength. The signal may be merged with signals coming from the port labeled by R. As a result, a multiplexed signal may be produced from the port labeled by C.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A method for producing an integrated optical device, the method comprising:
    providing an opto-electrical conversion device and an optical device, the opto-electrical conversion device packaged in a TO-can and the optical device packaged in two coaxially joined tubes, a first one of the two tubes to position at least one fiber core, and the a second one of the two tubes to house two lenses and a filter;
    aligning the opto-electrical conversion device and the optical device coaxially;
    applying a certain amount of epoxy to contacts between an end of the second tube and the TO-can, wherein outer diameters of the second tube and the TO-can are substantially similar so that the second tube is directly glued onto the TO-can; and using a UV light or heat to cure the epoxy to form the integrated optical device.

2. The method of claim 1, wherein the optical device is bonded in the tube by a certain amount of epoxy that is later cured by a UV light source or heat.

3. The method of claim 2, wherein a surface of the TO-can is treated by a reduction agent based primer to increase its bounding ability with the epoxy.

4. The method of claim 2, wherein the optical device includes a first fiber core, a second fiber and a third fiber core, the first fiber core is used for receiving a multiplexed signal, the second fiber core is used for reflecting the multiplexed signal excluding a particular wavelength, and the third fiber core is used to couple a signal of the particular wavelength to the opto-electrical convention device.

5. The method of claim 4, wherein the optical device is for dropping the signal of the particular wavelength from the multiplexed signal.

6. The method of claim 2, wherein the optical device includes a first fiber core, a second fiber and a third fiber core, the first fiber core is used for outputting a multiplexed signal, the second fiber core is used for receiving the multiplexed signal excluding a particular wavelength, and the third fiber core is used to receive a signal of the particular wavelength from the opto-electrical convention device.

7. The method of claim 6, wherein the optical device is for adding the signal of the particular wavelength to the multiplexed signal.

8. An integrated optical device comprising:

an opto-electrical conversion device packaged in a TO-can;

an optical device packaged in two coaxially joined tubes, a first one of the two tubes to position at least one fiber core, and the a second one of the two tubes to house two lenses and a filter; and wherein the opto-electrical conversion device and the optical device are aligned coaxially, and outer diameters of the second tube and the TO-can are substantially similar so that an end of the second tube is directly glued onto the TO-can by a certain amount of epoxy that is later cured by a UV light.

9. The integrated optical device of claim 8, wherein the two lenses and the filter are bonded coaxially in the tube by a certain amount of epoxy that is later cured by a UV light source or heat.

10. The integrated optical device of claim 9, wherein a surface of the TO-can is treated by a reduction agent based primer to increase its bounding ability with the epoxy.

11. The integrated optical device of claim 8, wherein the optical device includes a first fiber core, a second fiber and a third fiber core, the first fiber core is used for receiving a multiplexed signal, the second fiber core is used for reflecting the multiplexed signal excluding a particular wavelength, and the third fiber core is used to couple a signal of the particular wavelength to the opto-electrical convention device.

12. The integrated optical device of claim 11, wherein the optical device is for dropping the signal of the particular wavelength from the multiplexed signal.

13. The integrated optical device of claim 8, wherein the optical device includes a first fiber core, a second fiber and a third fiber core, the first fiber core is used for outputting a multiplexed signal, the second fiber core is used for receiving the multiplexed signal excluding a particular wavelength, and the third fiber core is used to receive a signal of the particular wavelength from the opto-electrical convention device.

14. The integrated optical device of claim 13, wherein the optical device is for adding the signal of the particular wavelength to the multiplexed signal.

15. An integrated optical device comprising:

an opto-electrical conversion device packaged in a TO-can;

an optical device packaged in two coaxially joined tubes, a first one of the two tubes to position at least two fiber cores, a first one of the fiber cores carrying three (3) signals respectively at three different wavelengths $\lambda 1$, $\lambda 2$, and $\lambda 3$, a second one of the fiber cores carrying a reflected signal, and the a second one of the two tubes to house two lenses and a filter configured to transmit one of the signals at wavelength $\lambda 1$ and reflect two of the signals at wavelengths $\lambda 2$, and $\lambda 3$ that are included in the reflected signal, wherein the opto-electrical conversion device and the optical device are aligned coaxially, and outer diameters of the tube and the TO-can are substantially similar so that an end of the second tube is directly glued onto the TO-can by a certain amount of epoxy that is later cured by a UV light, and wherein the opto-electrical conversion device produces an electronic signal in accordance with the signal at wavelength $\lambda 1$ that is projected onto the opto-electrical conversion device by one of the two lenses.

* * * * *